US011317993B2

(12) United States Patent
Voudouris

(10) Patent No.: US 11,317,993 B2
(45) Date of Patent: May 3, 2022

(54) ORTHODONTIC DEVICE FOR OVERBITE CORRECTION

(71) Applicant: Spartan Orthodontics Inc., Toronto (CA)

(72) Inventor: John Voudouris, Toronto (CA)

(73) Assignee: Spartan Orthodontics Inc., Toronto (CA)

(*) Notice: Subject to any disclaimer, the term of this patent is extended or adjusted under 35 U.S.C. 154(b) by 240 days.

(21) Appl. No.: 16/501,104

(22) Filed: Feb. 9, 2018

(65) Prior Publication Data

US 2019/0336248 A1    Nov. 7, 2019

(51) Int. Cl.
*A61C 7/14* (2006.01)

(52) U.S. Cl.
CPC .............. *A61C 7/145* (2013.01); *A61C 7/143* (2013.01); *A61C 7/146* (2013.01)

(58) Field of Classification Search
CPC ......... A61C 7/145; A61C 7/143; A61C 7/146; A61C 7/12; A61C 7/125; A61C 7/148; A61C 7/36; A61C 7/14
See application file for complete search history.

(56) References Cited

U.S. PATENT DOCUMENTS

| 4,529,382 A * | 7/1985 | Creekmore ............... A61C 7/12 433/16 |
| 6,142,775 A * | 11/2000 | Hansen .................... A61C 7/12 433/14 |
| 7,597,553 B2 * | 10/2009 | Kimura .................... A61C 7/16 433/16 |
| 9,615,898 B2 * | 4/2017 | Ariza ....................... A61C 7/14 433/9 |
| 2012/0064474 A1 * | 3/2012 | Lewis ....................... A61C 7/14 433/8 |
| 2019/0231486 A1 * | 8/2019 | Dickerson .............. A61C 7/141 |

* cited by examiner

*Primary Examiner* — Nicholas D Lucchesi
(74) *Attorney, Agent, or Firm* — McMillan LLP

(57) ABSTRACT

An overbite correction device for use on an upper incisor or canine tooth is provided. The device has a bracket body including two rounded lingual protrusions, and a vertical slot therebetween; and a base for bonding to the upper incisor or canine tooth at a lingual side thereof by means of a bonding pad. The two curved lingual protrusions feature a curved lower-facing surface for receiving an incisor, to prevent incisor interference during grinding. The device may feature an aperture for receiving an elastic thread or metal ligature to tie multiple overbite correction devices together. Advantageously, if one device breaks off from a tooth, it is not ingested.

7 Claims, 24 Drawing Sheets

ORTHODONTIC DEVICE FOR OVERBITE CORRECTION

FIELD OF THE INVENTION

The present invention relates generally to orthodontic appliances, and more specifically to an orthodontic device for overbite protection.

BACKGROUND OF THE INVENTION

Experienced orthodontic clinicians often report that upper and lower incisor overlappings called severe, deep overbites ranging from 75-120% are one of the most challenging orthodontic treatments. New tools to address deep overbite are desirable. Research has verified deep overbites are also highly susceptible to one of the highest levels of relapse. One of the main reasons appears to be centered around increased muscle hyperactivity that has long been associated with the cause of deep overbite. However, this muscle hyperactivity is secondary to our current clinical perception. The central nervous systems (CNS) plays a higher role through CNS hyperactivity, tension, or stress that is a precursor to producing muscle hyperactivity (in conjunction with other implicating factors such as dental interferences and crossbites). Due to the primary nature of the CNS aetiology, today the differentiating term CNS-Muscle hyperactivity is preferred to the blended and often lost term of neuromuscular activity used in the past. The genetic CNS disposition and personality of the patient is a primary factor compared to simply muscle hyperactivity in severe overbite.

CNS-Muscle hyperactivity may additionally influence the malalignment of the dentition. In vertical mandibular overclosure (VMO) into the maxilla, found in Class II division 1 malocclusion with severe overjet, the lower incisal edge can be crowded by the cingulum of the upper incisor. In fact, lower incisal edges have been found to impinge the palatal gingiva in severe overbite. Secondly, VMO also provides less space for the dentition vertically where tongue space is also restricted, which can result in proclination of the lower incisors into the strong perioral musculature. Thirdly, it is clinically significant that muscle hyperactivity be viewed from the labial and lingual since it includes the masseter-medial pterygoid sling and temporalis, but also tongue hyperactivity associated with buccal segment intrusion. In the transverse dimension, it is not unusual to find the lateral borders of the confined tongue to be scalloped with dental impressions as it attempts to find space by spreading out and pressing onto the occlusal surfaces of the lingual cusps during swallowing and at rest, associated with further buccal segment intrusion.

Aetiology of deep overbite includes: 1. CNS hyperactivity, tension or stress; 2. Masticatory muscle hyperactivity, particularly the elevators masseter and temporalis muscles; 3. Facial muscle hyperactivity such as the orbicularis oris in Class II division 2 patients affecting upper central incisors; 4. Skeletal restriction of the dentoalveolar growth of the buccal segments; 5. Skeletal upward and forward or counter clockwise growth of the mandible at the chin (brachycephalics); and 6. Dental interferences, crossbites, missing buccal dental units, TMD and severe posterior enamel wear reducing the posterior vertical support of the dentition related to CNS-Muscle hyperactivity.

Several appliances have been developed to control the CNS-muscle hyperactivity including traditional removable or cemented anterior bite planes soldered to molar bands, and bondable resin or brackets on the palatal of the upper incisors or molars. The resin bite ramps were easily worn and swallowed gradually by the patient, often requiring resin additions, and when placed at the molars produced molar intrusion that was contraindicated. Bondable metal bracket type bite planes were more effective and efficient to apply chairside, however, they were often difficult to remove because of their solid form and design that made them rigid and uncomfortable during the debonding phase, particularly at the sensitive upper central incisors.

It is an object of the present invention to develop a device that overcomes the above-mentioned overbite problems.

BRIEF DESCRIPTION OF THE DRAWINGS

The background and embodiments of the present invention will be described below with reference to the attached drawings in which.

DETAILED DESCRIPTION OF THE EMBODIMENT

Figure 1:
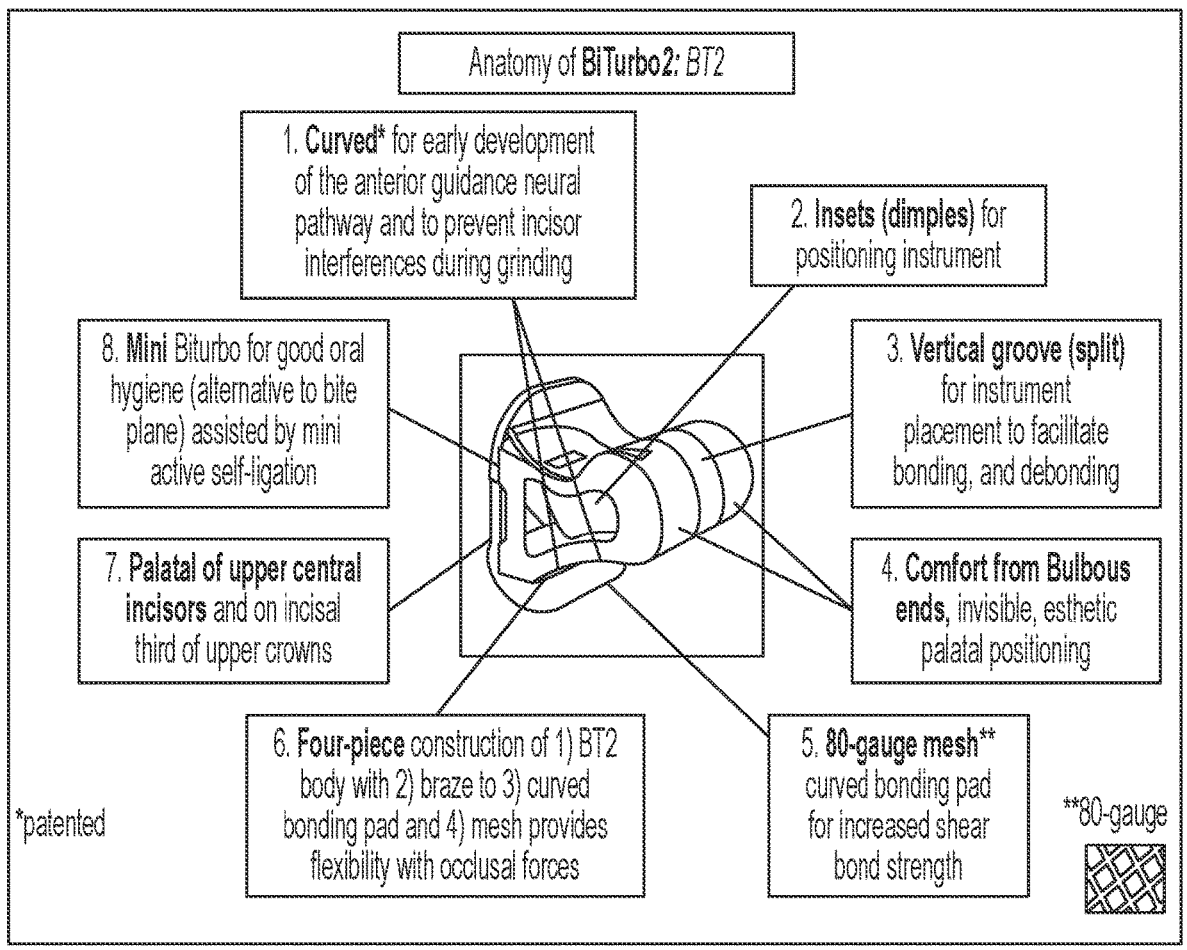

Embodiments of the present invention will now be presented by way of example only and not limitation.

A second generation, overbite correction device or bite tower, referred to as BT2 and presented herein, includes: 1. Bracket body with vertical groove (split), with incisal surface curvature; 2. Braze (for flexibility); 3. Curved bonding pads to complement and adapt to the curved palatal anatomy of the upper central incisor for improved bond strength; and 4. Separate 80-gauge mesh for greater bond strength.

With reference to FIGS. 3-9, an overbite correction device (bite tower) 100 is provided. Device 100 has a bracket body 110, including two bulbous rounded lingual protrusions 120. Device 100 is applied to a lingual side of maxillar (upper) incisors, or to a lingual side of mandibular (lower) incisors. Therefore the bulbous rounded lingual protrusions 120 provide tongue comfort. The bracket body 110 features two curved incisal lower-facing surfaces 125 which mimic the lingual anatomy of the upper incisors for more ideal anterior guidance during forward protrusion of the upper incisors during chewing or grinding and corresponding upper-facing surfaces 140. A vertical split (or slot) 130 is formed, in the bracket body 110, between the lingual protrusions 120 for instrument placement to facilitate bonding and debonding of the device to and from a tooth. For example, vertical slot 130 specifically permits easier positioning of the overbite correction device 100 as a purchase groove where a periodontal straight probe instrument, or a scaler can fit into the split 130. Additionally, split 130 allows the collapse of the overbite correction device (bite tower) 100 after use when debonding. This presents an advantage over with solid metal prior art devices, which are more rigid and more difficult to use as a result.

The lower-facing surface 125 of bracket body 110 is curved for early development of the anterior guidance neural pathway, and to prevent incisor interferences during grinding. The bracket body 100 also features dimples (or insets) 150 formed on the outer surfaces of lingual protrusions 120. The dimples 150 provide improved grip for placement of the overbite correction device (bite tower) 100 with a tweezer instrument.

The bracket body 110 features a curved bonding pad 190 including, for example, an 80-gauge mesh, for increased shear bond strength.

The vertical groove 130 along the long axis of the BT2 overbite correction device 100 permits the use of a periodontal probe or other instrument to position and press-bond the BT2 to the enamel more efficiently and accurately. The separate application of 80-gauge bonding mesh is used to improve bond strength against palatal shearing forces. BT2s are miniaturized in size similar to bondable buttons but with a curved, shield shape bonding pad to be comfortable for patients and to facilitate oral hygiene. In addition, side dimples 150 were developed to permit purchase points for tweezers during positioning on the palatal of the upper incisors. BT2s (bite towers) 100 are required commonly in deep overbite treatment that is associated with severe CNS-Muscle hyperactivity.

With reference to FIGS. 10-16, another embodiment of the overbite correction device (or bite tower, BT2) 200, is shown. Bite tower 200 has a similar structure to bite tower 100, but also features an aperture 160 extending mesiodistally in the bracket body, for receiving an elastic thread of metal ligature therethrough. In one embodiment aperture 160 has beveled edge 165 giving it a funnel-like profile for facilitating the entry of an elastic thread or metal ligature.

In one embodiment, aperture 160 is round, as shown in FIGS. 10-16. In other embodiments, the aperture can be elliptical, square, rectangular, or triangular, or be of any other suitable shape.

Figure 18:
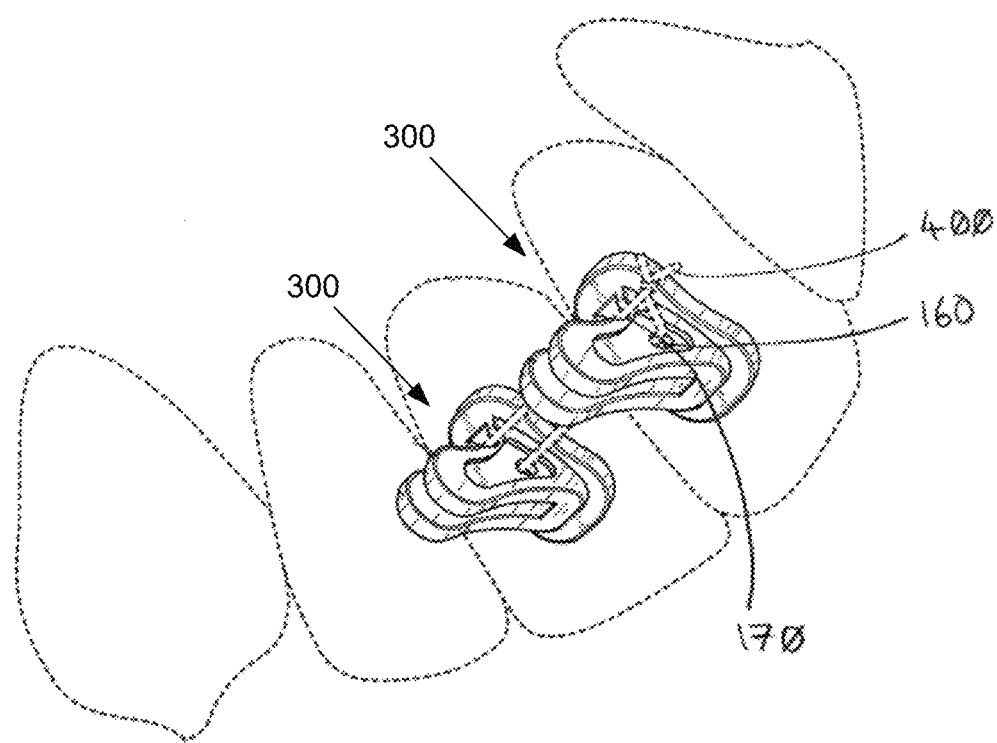
FIG. 18 is a top-side perspective view of the overbite correction device of FIG. 17, installed in a patient's mouth in the maxillary arch (upper), and having an elastic thread ligature passing therethrough and tied in a knot
Figure 19:
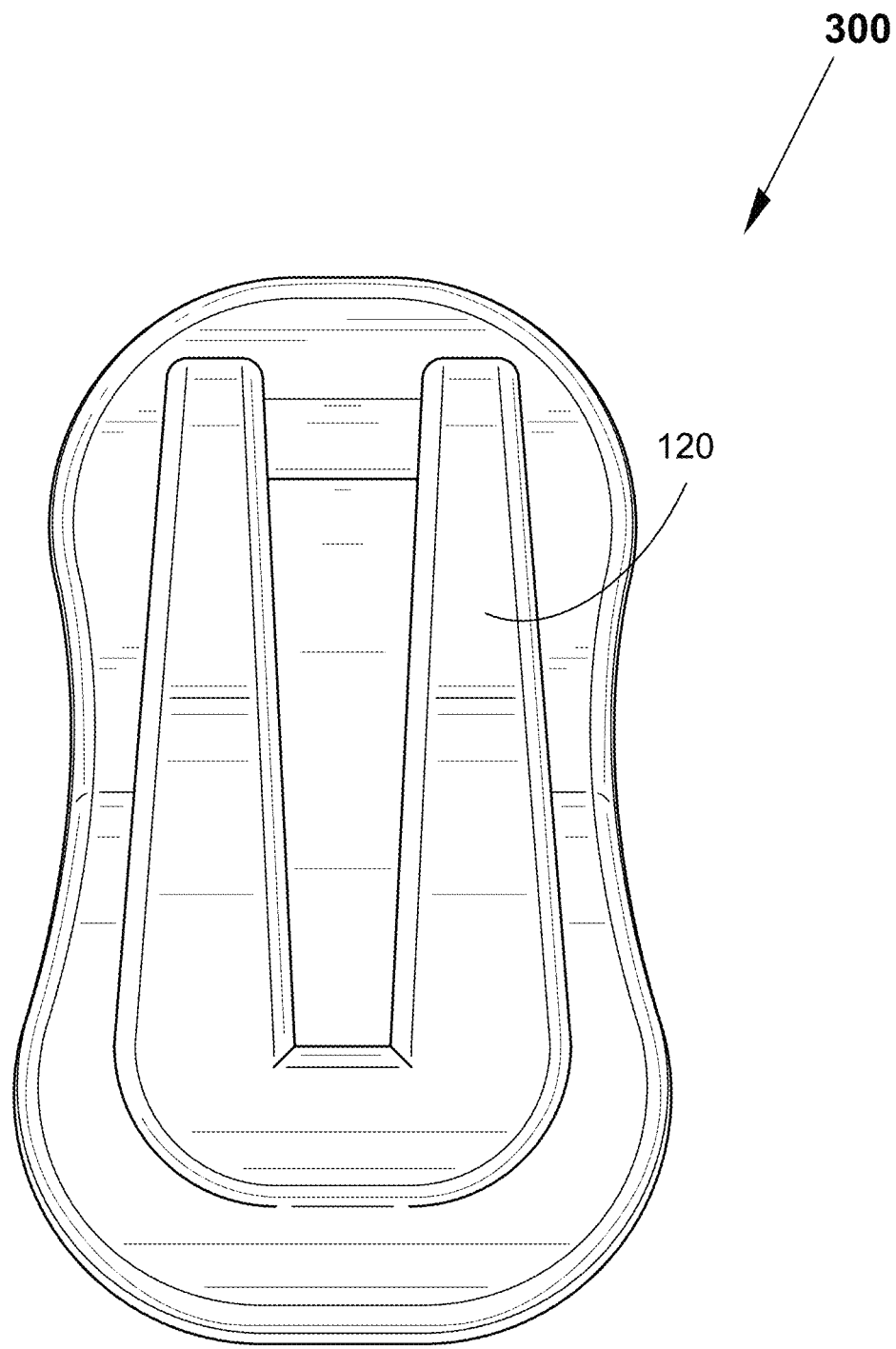
FIG. 19 is a front view of the overbite correction device of FIG. 17.
Figure 20:
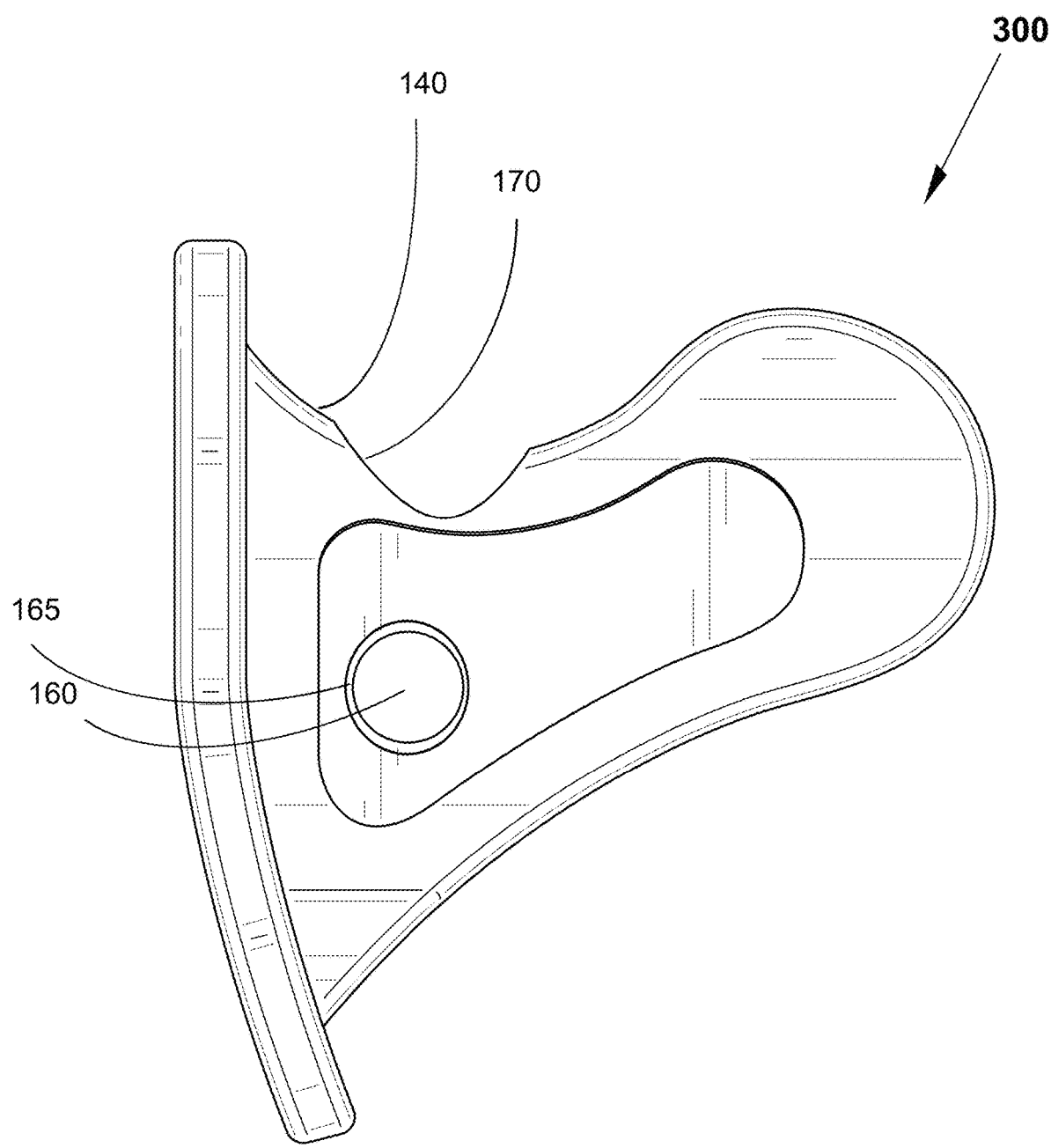
FIG. 20 is a left side view of the overbite correction device of FIG. 17.
Figure 21:
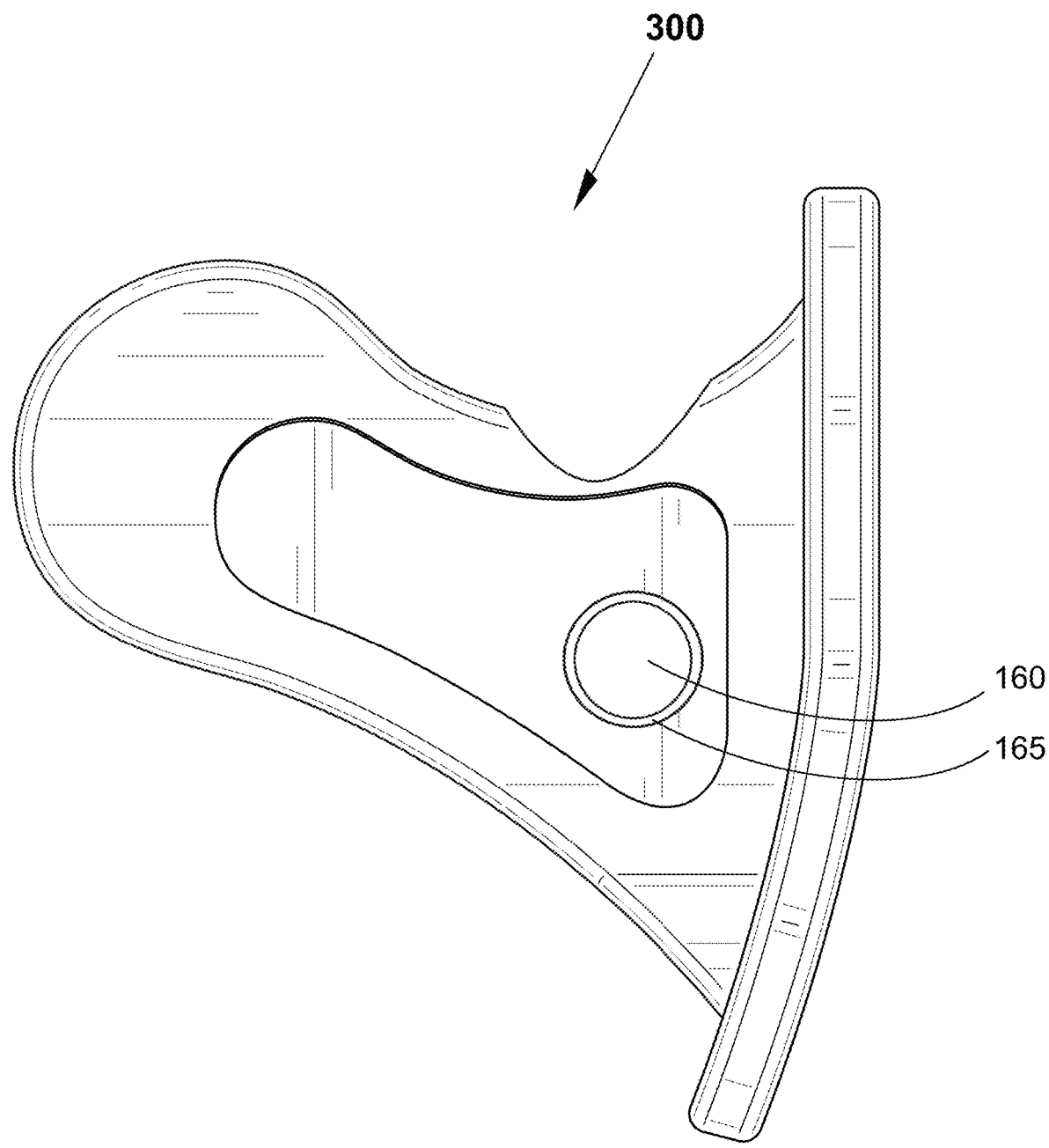
FIG. 21 is a right side view of the overbite correction device of FIG. 17.
Figure 22:
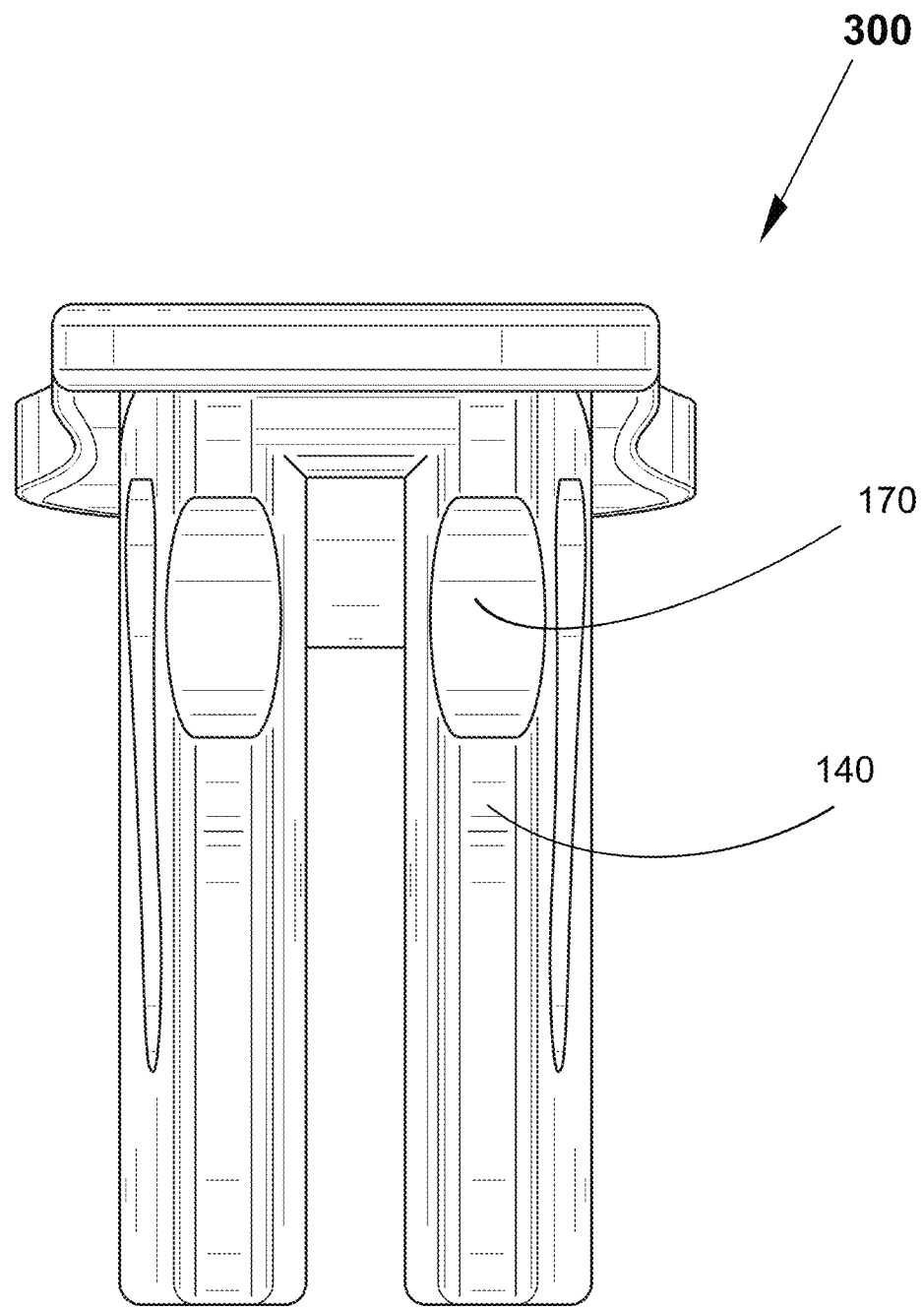
FIG. 22 is a top view of the overbite correction device of FIG. 17.
Figure 23:
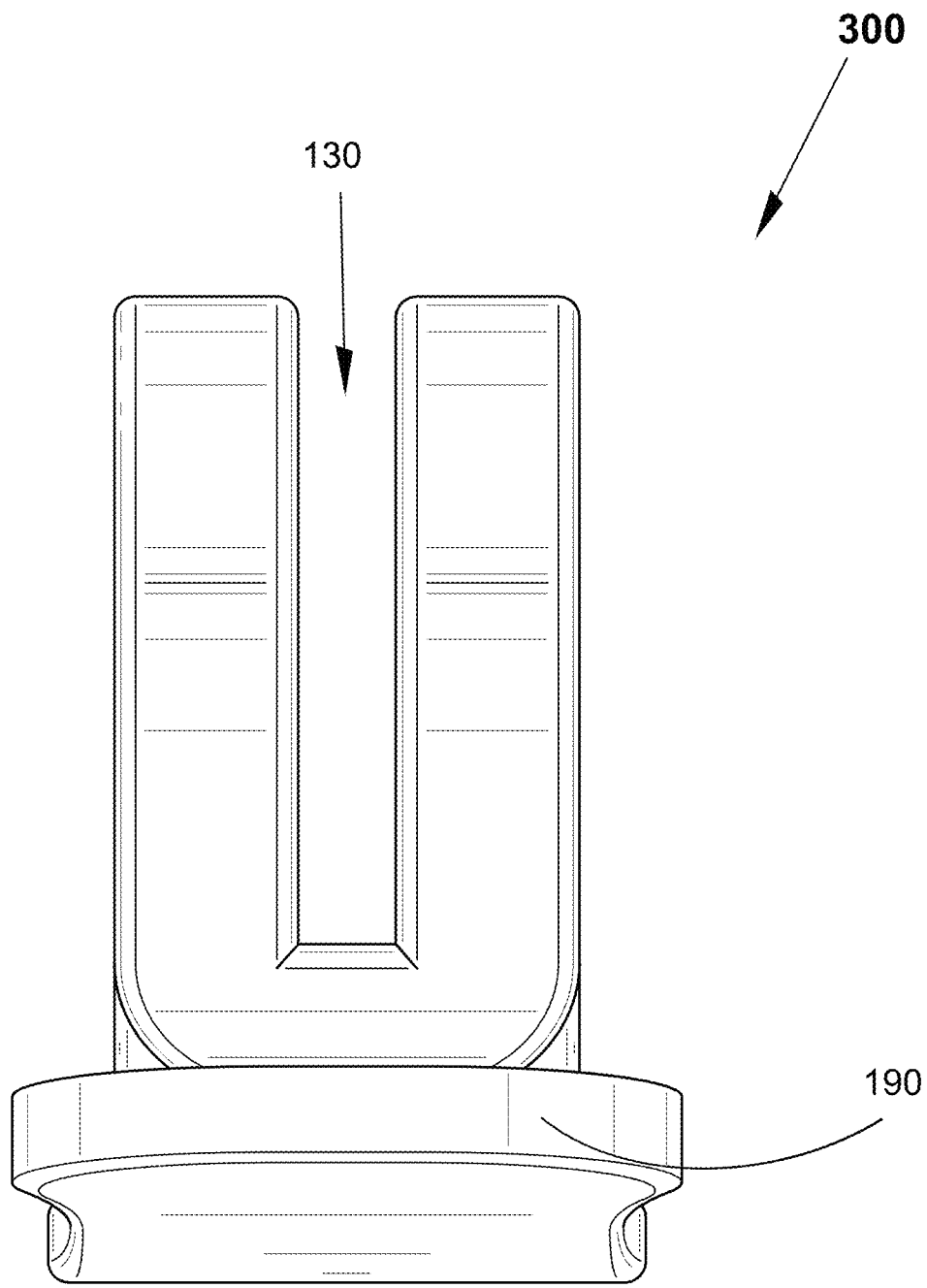
FIG. 23 is a bottom view of the overbite correction device of FIG. 17.

In yet another embodiment, shown in FIGS. 17-24, a bite tower 300 is shown. Bite tower 300 has a similar structure as bite tower 200, including aperture 160 with beveled edge 165. However, bite tower 300 also features a gingival groove (or recess, or undercut) 170 for allowing an elastic thread or metal ligature to rest on and be maintained therein during chewing. FIG. 18 shows a group of two bite towers 300 having an elastic thread ligature 400 passing through the apertures, resting on the gingival grooves 170, and tied in a knot. Accordingly, a kit of bite towers 300, along with a ligature 400 may be provided.

Figure 24:
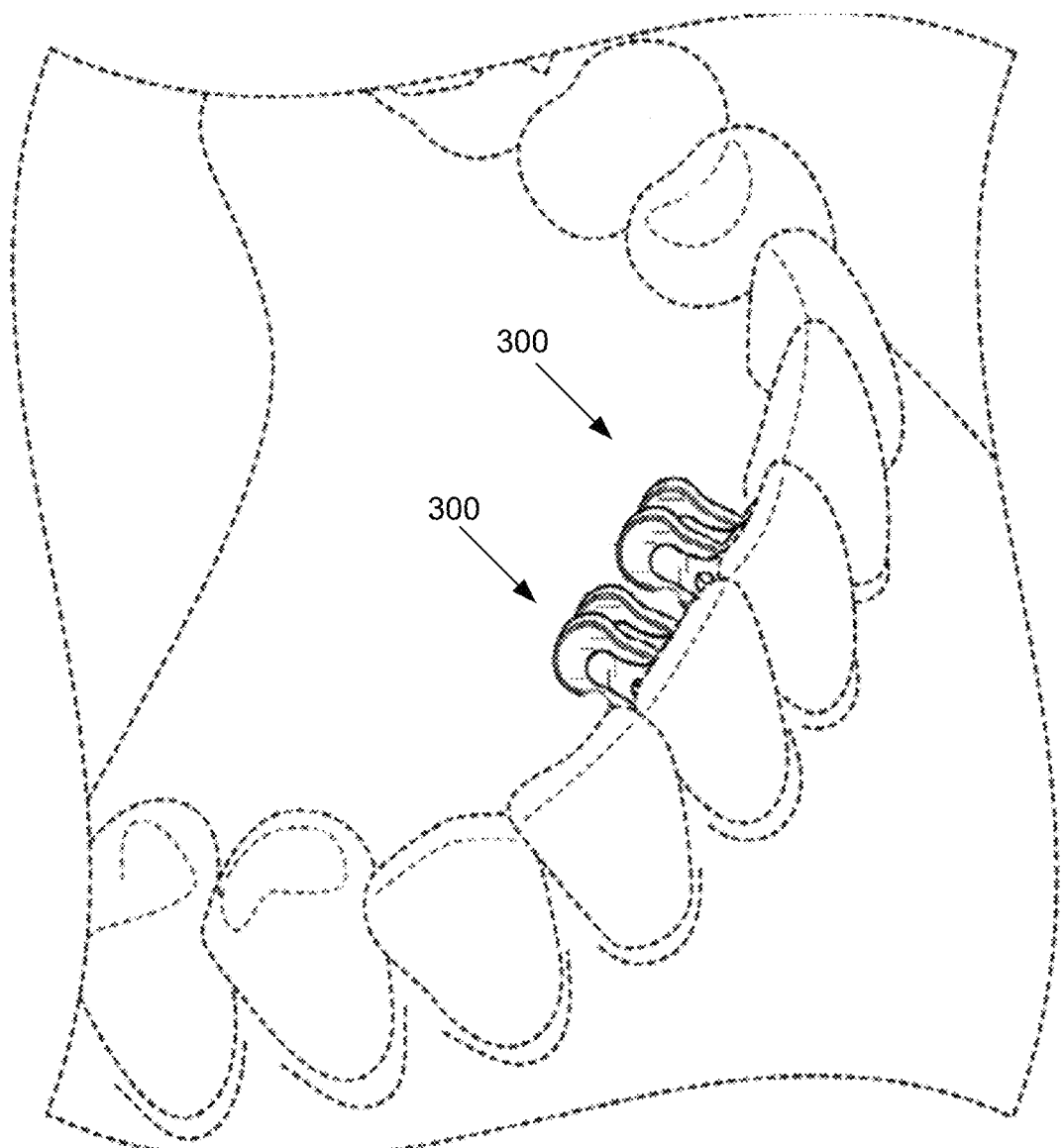
FIG. 24 is a top-side perspective view of the overbite correction device of FIG. 17, installed in a patient's mouth in the mandibular (lower) arch, for Class III underbite correction.

FIG. 24 shows the bite tower 300 applied to incisor teeth on the mandibular (lower) arch, for underbite correction. A thread ligature may be passed through the apertures of towers 300, may reset on the gingival grooves 170 thereof, and may be tied in a knot, in a manner similar to that shown in FIG. 18.

FIG. 29 shows the bite tower 300 applied to incisor teeth on the mandibular (lower) arch, for underbite correction. A thread ligature may be passed through the apertures of towers 300, may reset on the gingival grooves 170 thereof, and may be tied in a knot, in a manner similar to that shown in FIG. 23.

Advantageously, tying together the bite towers prevents aspiration or swallowing because typically only one bite tower breaks off from the incisors at a time. Accordingly, the elastic thread or metal ligature will hold the broken off bite tower as the thread of ligature is still held by the bite towers that have not broken off. Additionally, if a more rigid stainless steel wire is passed through the apertures of the bite towers, and the wire ends are turned or curled at the far ends for comfort, then the bite towers can also be positioned in a more level manner. When the bite towers are level, this advantageously causes them to be more evenly contacted by the lower incisors. This is superior to having overbite correction devices individually and unpredictably placed thus causing one device to be contacted more than the other, and therefore requiring grinding to even the contacts on the individual devices.

The bite towers presented herein, open deep overbites (or vertical overlapping) of the lower incisors deeply up into the upper incisors, such as in a 100% deep overbite (wherein a normal case would be only 20%). The bite towers (or overbite protection devices), open deep overbites by permitting biological, physiologic eruption of the posterior (buccal) dental units such as the molars, premolars, and canines when they are held open and apart, and not contacting posteriorly. There is also a mild intrusion effect on the upper incisors. Furthermore, by using the bite towers (100, 200, 300), and increasing the vertical dimensions of the anterior lower face, muscle hyperactivity, often associated with deep overbite and TMJ disorders, is significantly decreased.

The bite towers 100, 200, and 300 may be made of metal or a plastic type of material such as polycarbonate.

BT2 Placement

Clinically, BT2s are bonded on the middle, to preferably incisal-third region of the upper central incisors in Class II malocclusions. This provides a total of two BT2s on the day of first bonding of a full Siamese twin, active self-ligating (SL) appliance. In addition, in severe overjet of the upper incisors where the bite towers may not be contacted by the lower incisors located further posteriorly, the bite towers may be placed at the upper canines. Also for each deep overbite treatment BT2s are applied in conjunction with 2 buccal box elastics (¼", 4.5 oz) in rhomboid patterns for Class II correction. The elastics are applied from the labial aspects of the upper canine to the upper first molar, down to the lower second molar and first premolar bilaterally to facilitate rapid bite correction.

Reasons for Applying BT2

It is well known from electromyographical studies that muscle activity of the masticatory muscles is generally reduced when the vertical dimension of the anterior lower face height is increased with overbite correction. In addition, adults with untreated deep overbite with CNS-muscle hyperactivity often suffer from generalized enamel wear that can then induce a cycle for further reductions in the vertical dimension. When the vertical dimension is reduced, muscle hyperactivity increases further. This tends to set-off the destructive cycle of mutilation and collapse of the lower anterior face height characterised by progressively greater enamel wear with age. This reduction in enamel support produces further progressive increases in muscle hyperactivity leading to progressively deeper overbite. Progressive deepening of the overbite in children restricts skeletal eruption of the dentoalveolar structures of the buccal segments that is generally maintained life-long without orthodontic treatment.

Humans use only approximately 10% of their muscle activity for chewing (25 lbs). However, it is well known during clenching and other parafunctional activity that these forces can exceed 10 times the chewing force (250 to 300 lbs). Normal swallowing takes place approximately 600-1000 times/day or more (including during chewing and speaking) that maintains the restriction of dental eruption in the buccal segments into adult life. BT2s are used in conjunction with active self-ligating appliances due to the low resistance of the appliance shown in vitro, to permit unobstructed and controlled extrusive movements of the archwires at the upper and lower buccal segments. Once the posterior vertical dimension increases and the incisors begin to develop a positive overbite relationship, the tongue generally begins to rebalance vertically into the greater vertical space and more posteriorly into a more natural tongue position. This assumes the aetiology of the deep overbite has been additionally controlled long term with an anterior bite plane to be worn for one-year post-treatment, then overnight every night.

In addition to CNS-muscle hyperactivity, deep overbites are associated with skeletal counter clockwise rotation of the mandible as part of the archival growth path of patients with brachyfacial types. This can explain why it is not unusual that as the orthodontist attempts to increase the vertical dimension in a growing child with strong anterosuperior growth of the condyles and a counter clockwise mandibular rotation pattern compounded by severe CNS-muscle hyperactivity, the deep overbite is highly resistant to orthodontic correction. This strong skeletal growth pattern is another reason deep overbites are one of the most difficult challenges, and where BT2s are valuable in controlling or breaking the pattern of CNS-muscle hyperactivity.

Applying BT2

BT2s are recommended at all ages, including for both early interceptive treatment in children, and in adults. Prior to the placement of BT2s, all patients, particularly sensitive adults are informed most importantly, that the new BT2 technology will save several months (up to 3-4 months) of orthodontic treatment of the overbite that is the largest challenge. Sensitive patients are instructed it will possibly take 2-3 days to accommodate to the new vertical height, and to the feeling of the BT2s where wax is also provided to place over the BT2s for 3 days. Eating may temporarily be affected requiring soft foods, and they may also possibly affect speech mildly and temporarily (that is uncommon with the bulbous ends of two BT2s).

The ideal recommended time of BT2 placement is at the time of the bracket placement (that are regularly positioned on the labial aspects). BT2s and active self-ligating brackets are ideal with synergistic, specialized reverse edgewise archwires that have a higher vertical dimension than horizontal dimension (for example 0.018×0.014") for early moments of torque for control of the roots required in deep overbite correction.

The archwires, once again, incorporate compensating curve on the upper archwire and reverse curve of Spee for the lower archwire to further facilitate incisor intrusion. BT2s are worn for at least 6 months and tooth movements are facilitated by the eruption (or extrusion) of the buccal segments, where the rhomboid-shaped elastics (¼", 4.5 oz) are place bilaterally. No clinically significant root resorption is found generally with the use of this biocompatible force system as it gradually reduces the vertical mandibular overclosure and muscle activity.

How BT2 works

Figure 2:
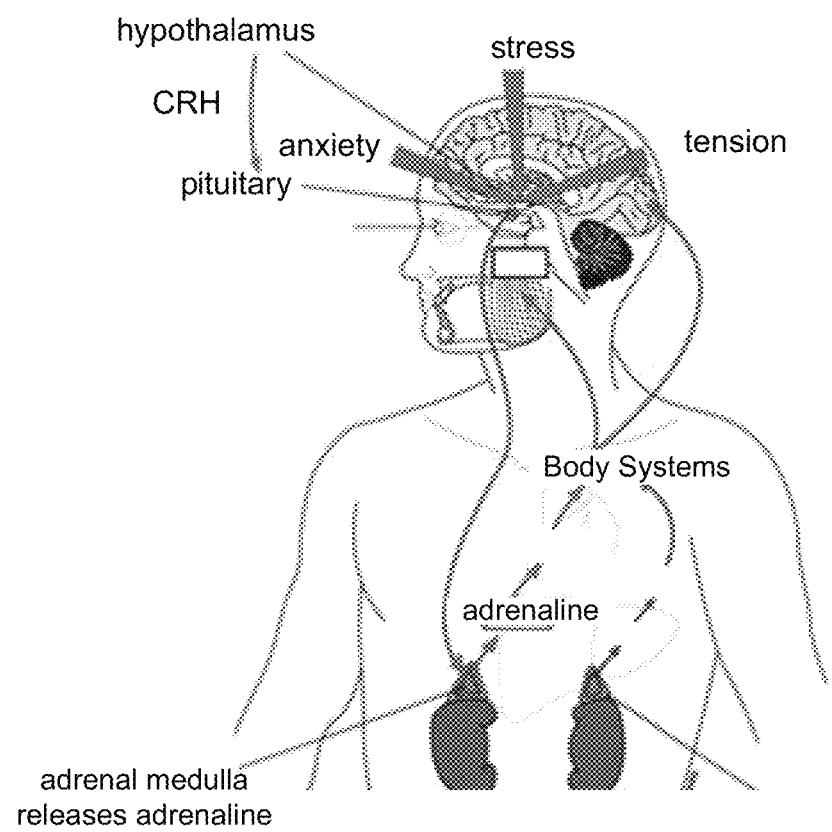
FIG. 2 shows the mechanism of how the overbite correction device (BT2) works, including the application of buccal rhomboid elastics with active SL.
Figure 3:
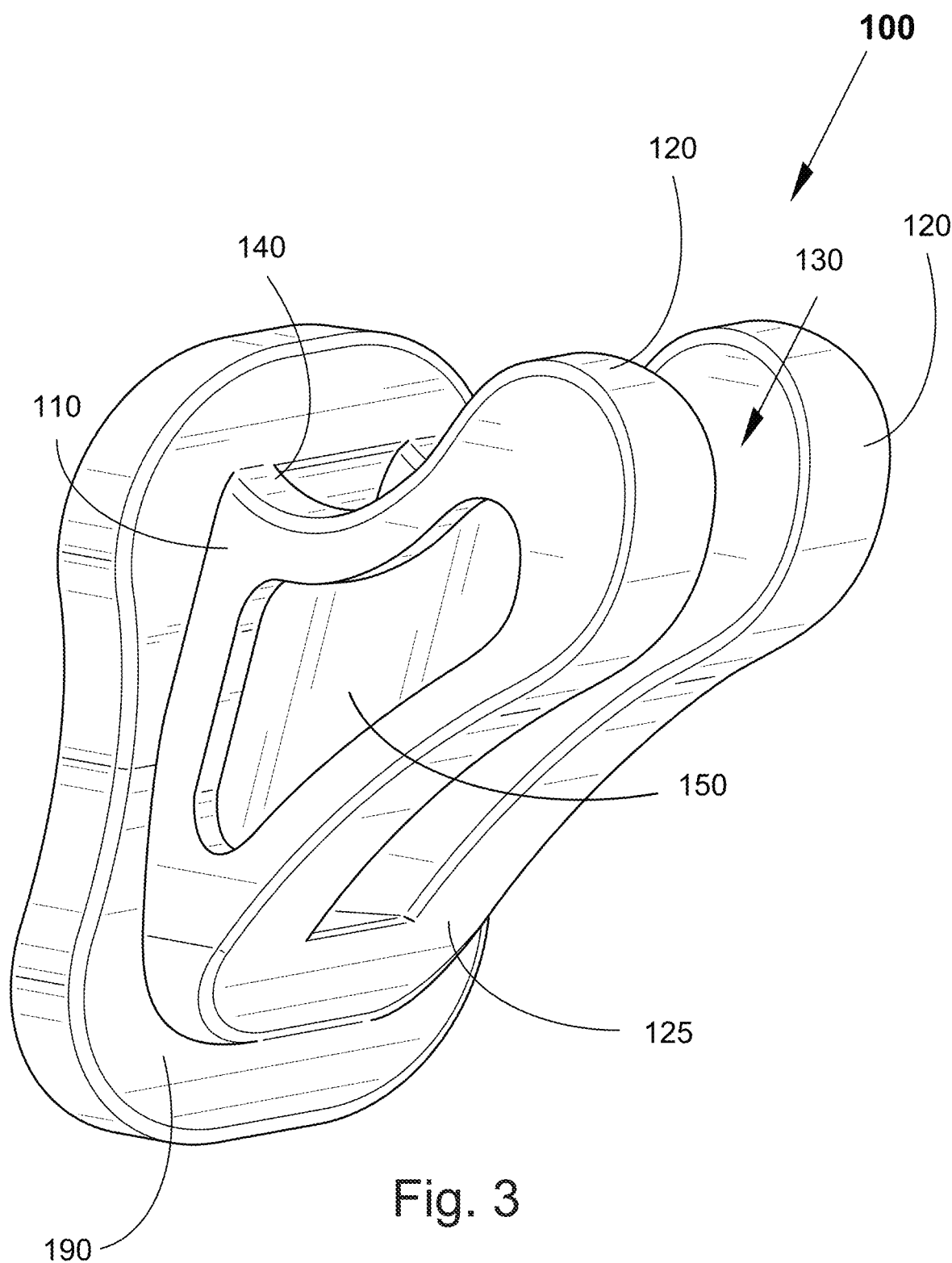
FIG. 3 is a side perspective view of the overbite correction device of FIG. 1.
Figure 4:
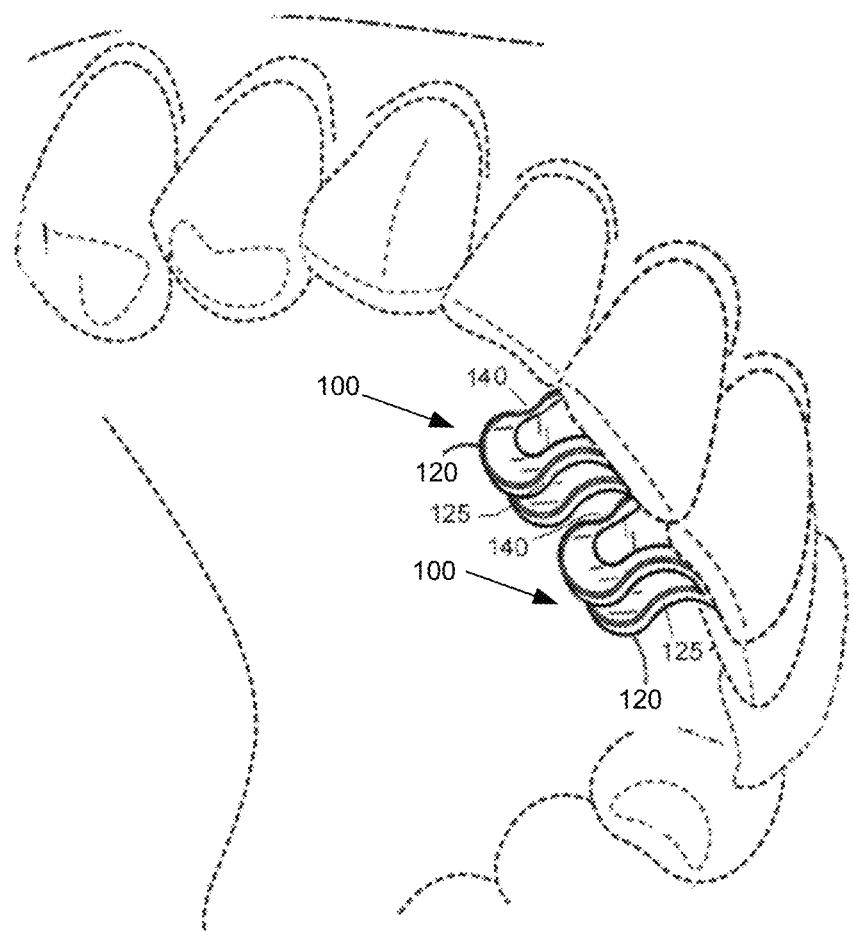
FIG. 4 is a top-side perspective view of the overbite correction device of FIG. 3, installed in a patient's maxillary (upper) arch.
Figure 5:
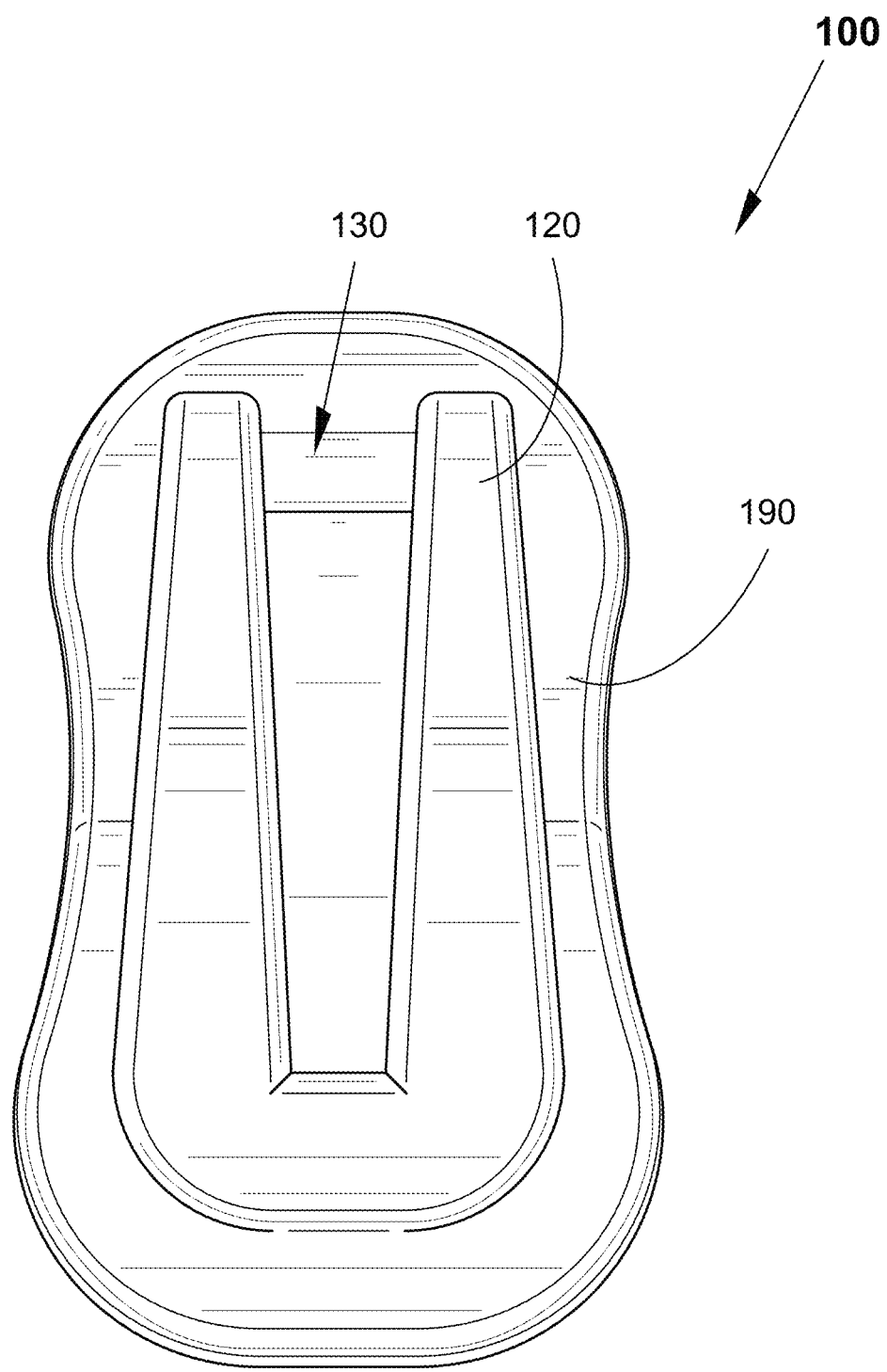
FIG. 5 is a front view of the overbite correction device of FIG. 3.
Figure 6:
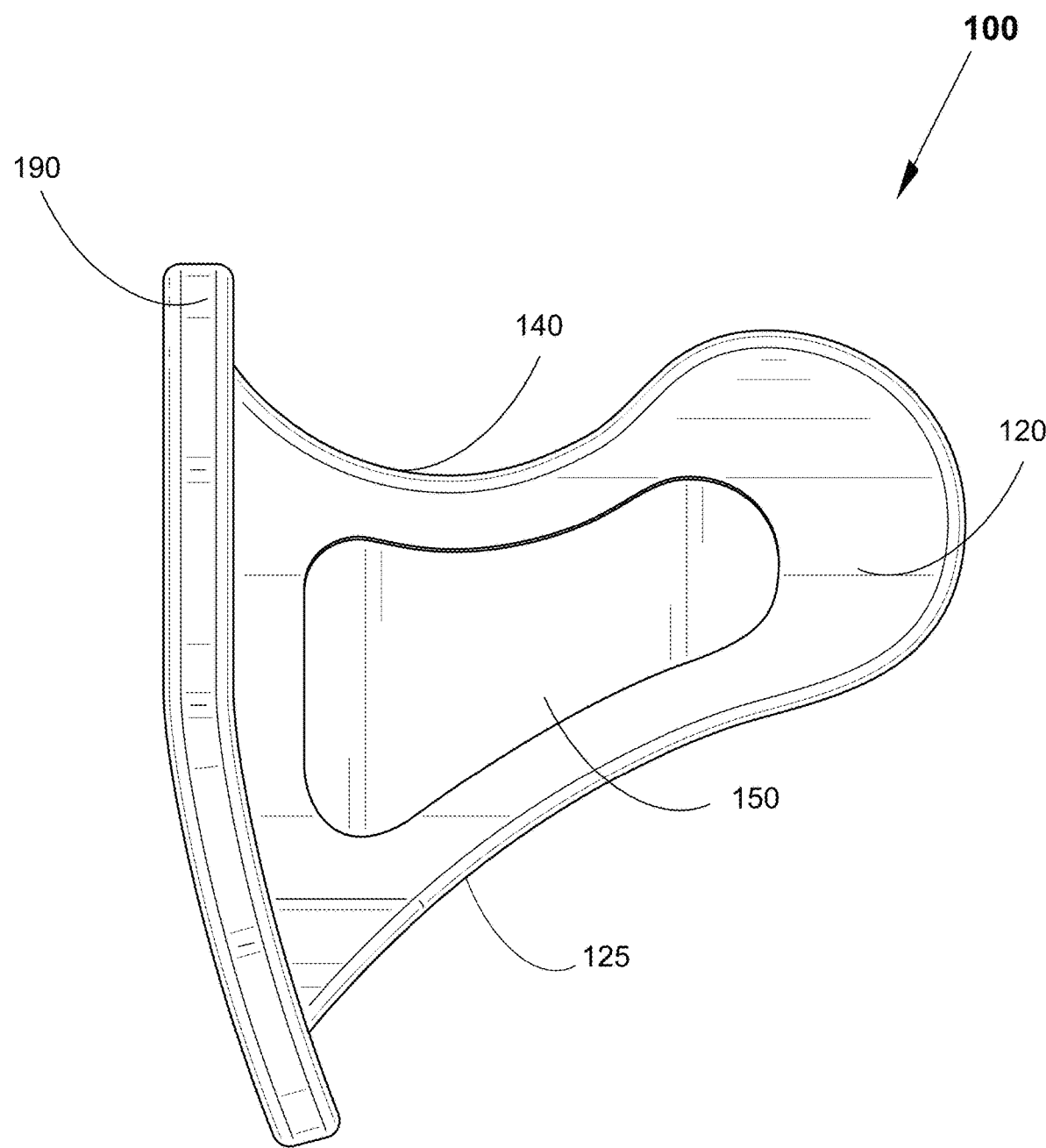
FIG. 6 is a left side view of the overbite correction device of FIG. 3.
Figure 7:
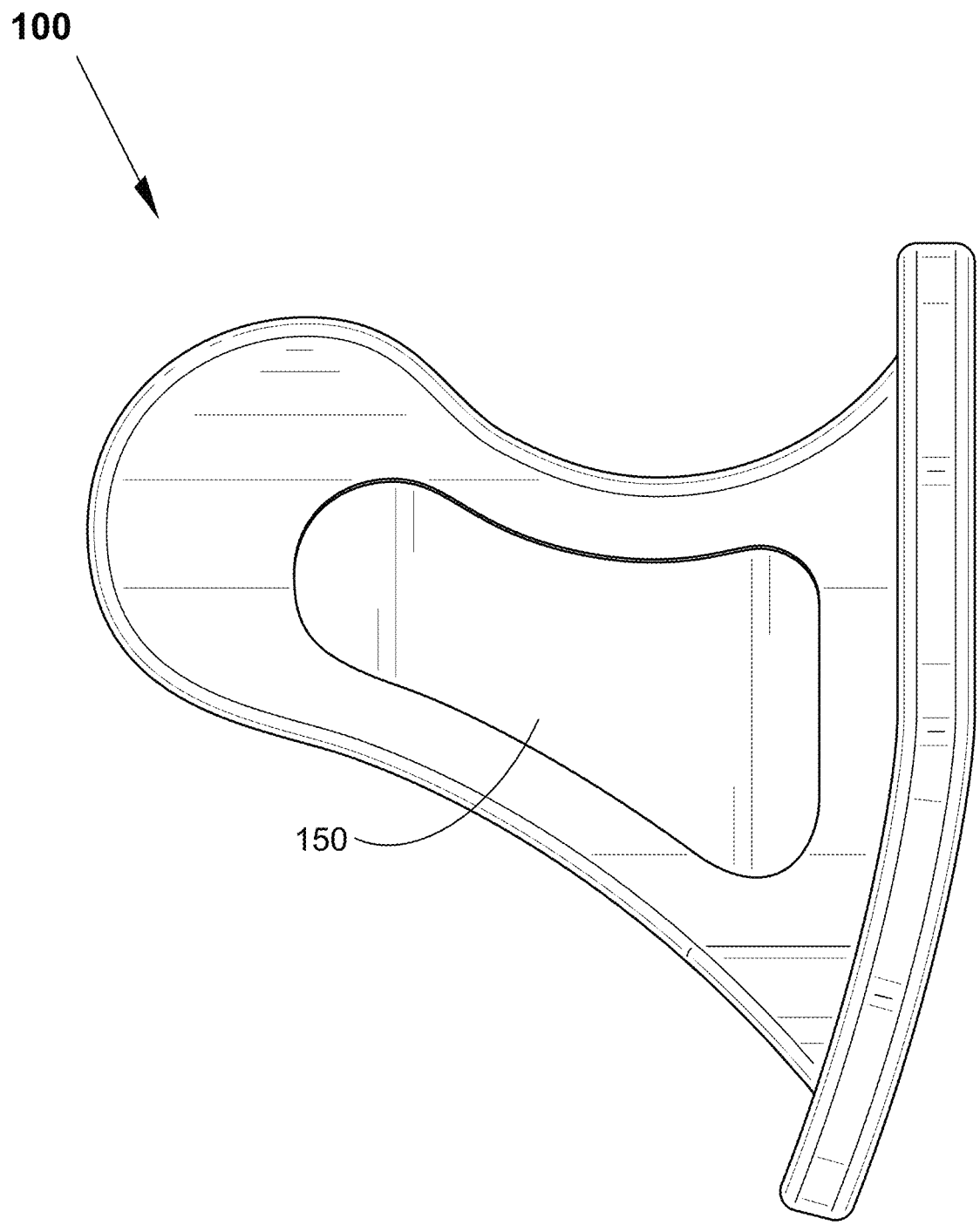
FIG. 7 is a right side view of the overbite correction device of FIG. 3.
Figure 8:
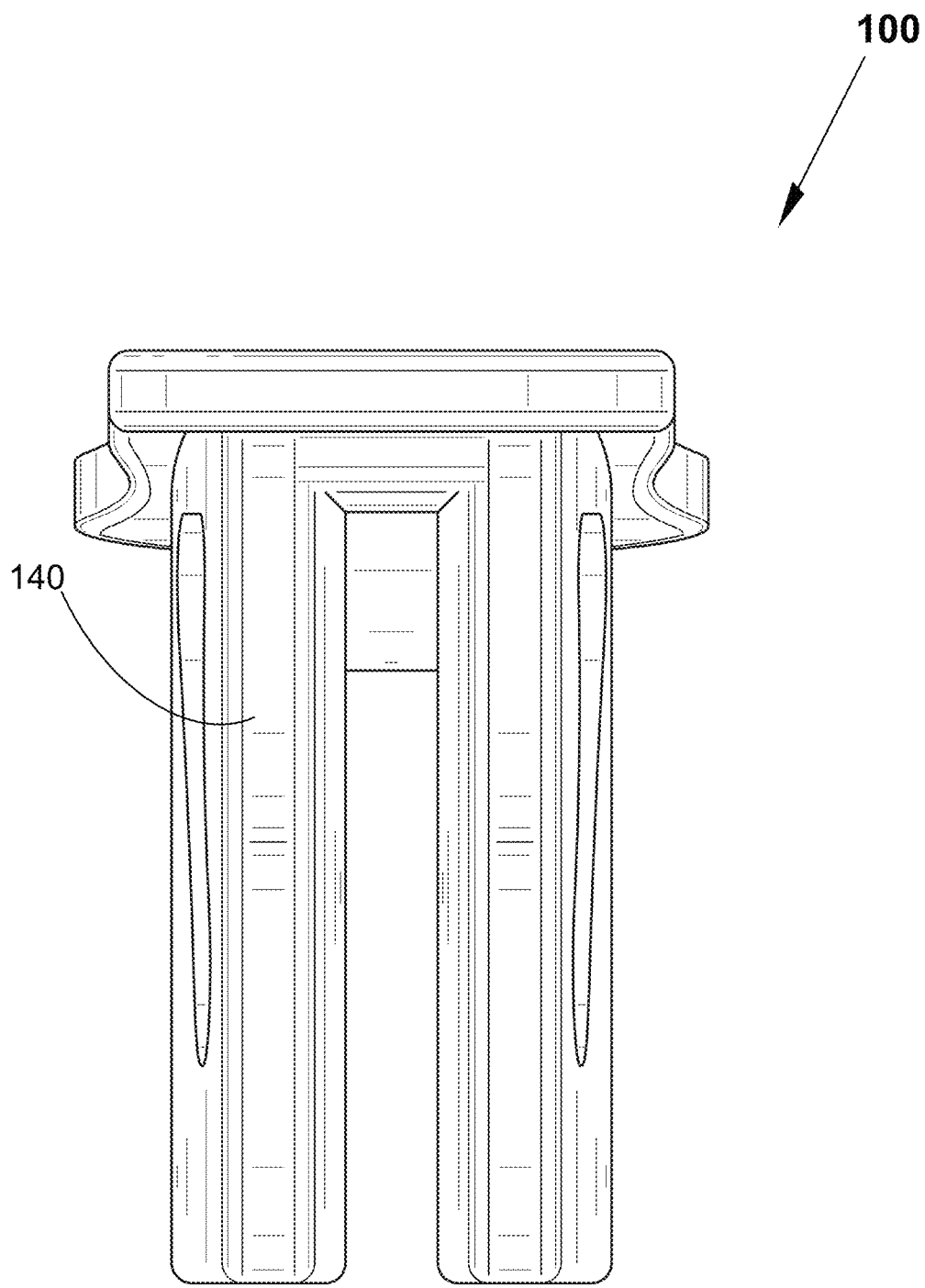
FIG. 8 is a top view of the overbite correction device of FIG. 3.
Figure 9:
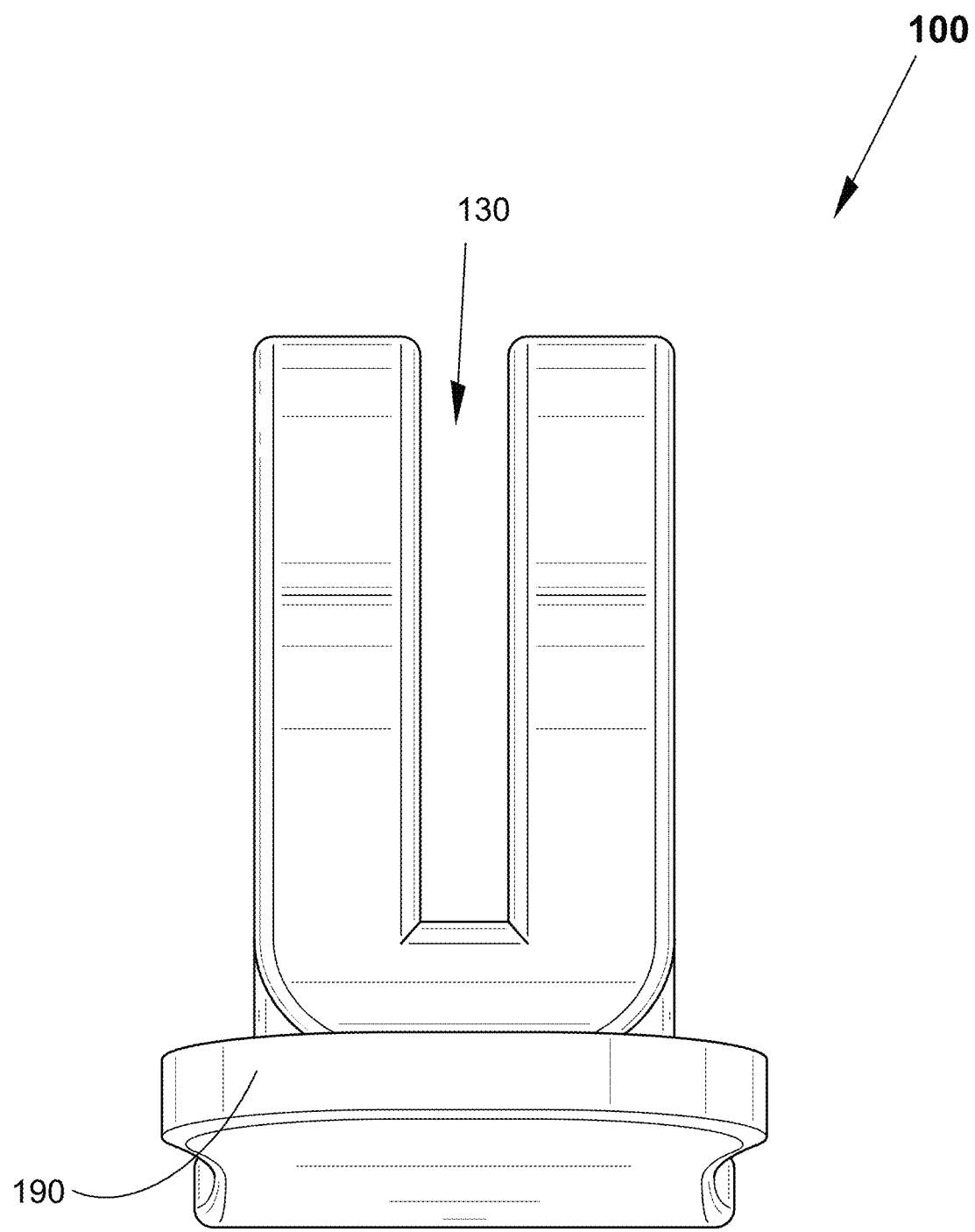
FIG. 9 is a bottom view of the overbite correction device of FIG. 3.
Figure 10:
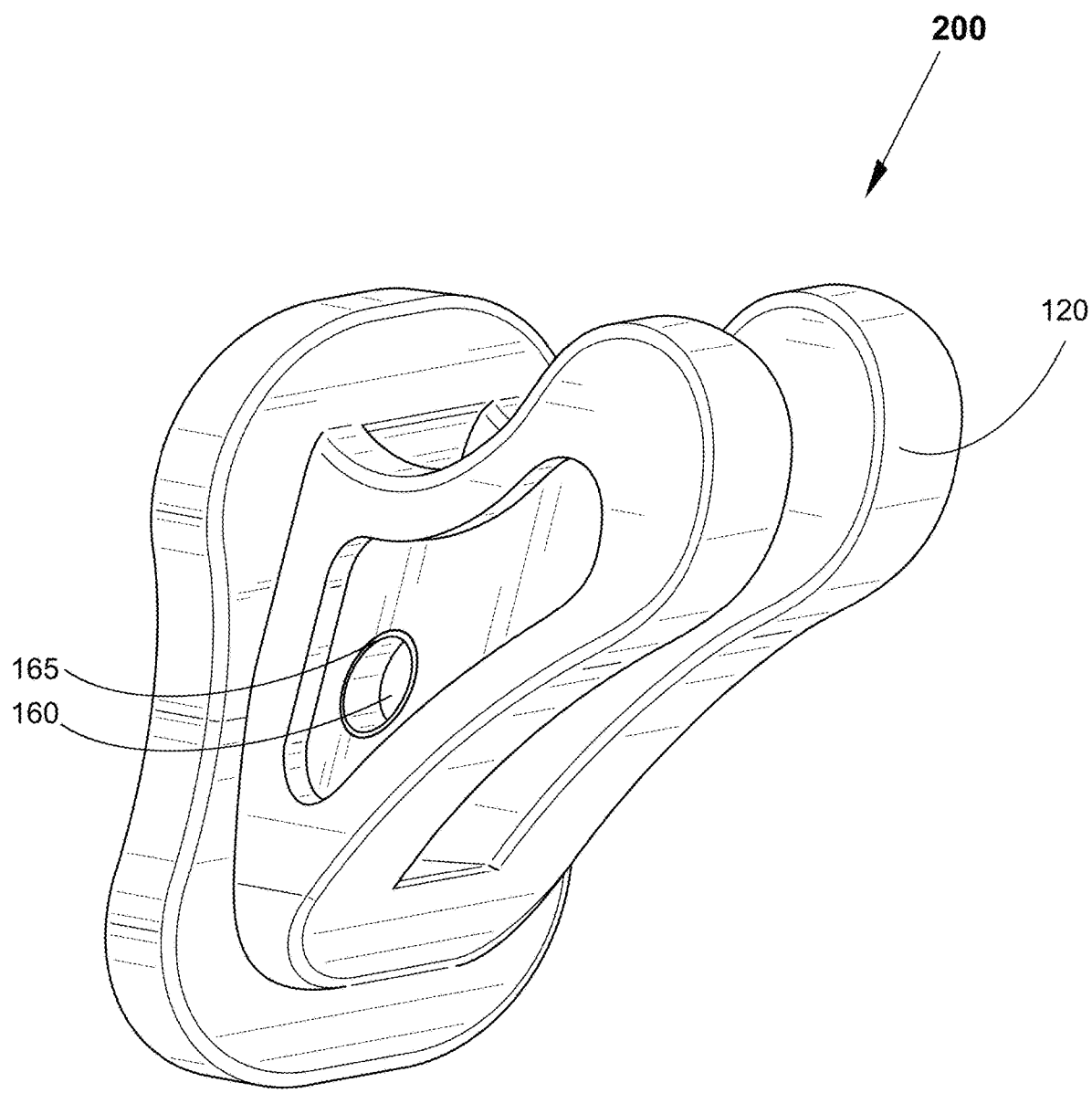
FIG. 10 is a side perspective view of an overbite correction device, having a round aperture and bevel therethrough, in accordance with another embodiment of the present invention.
Figure 11:
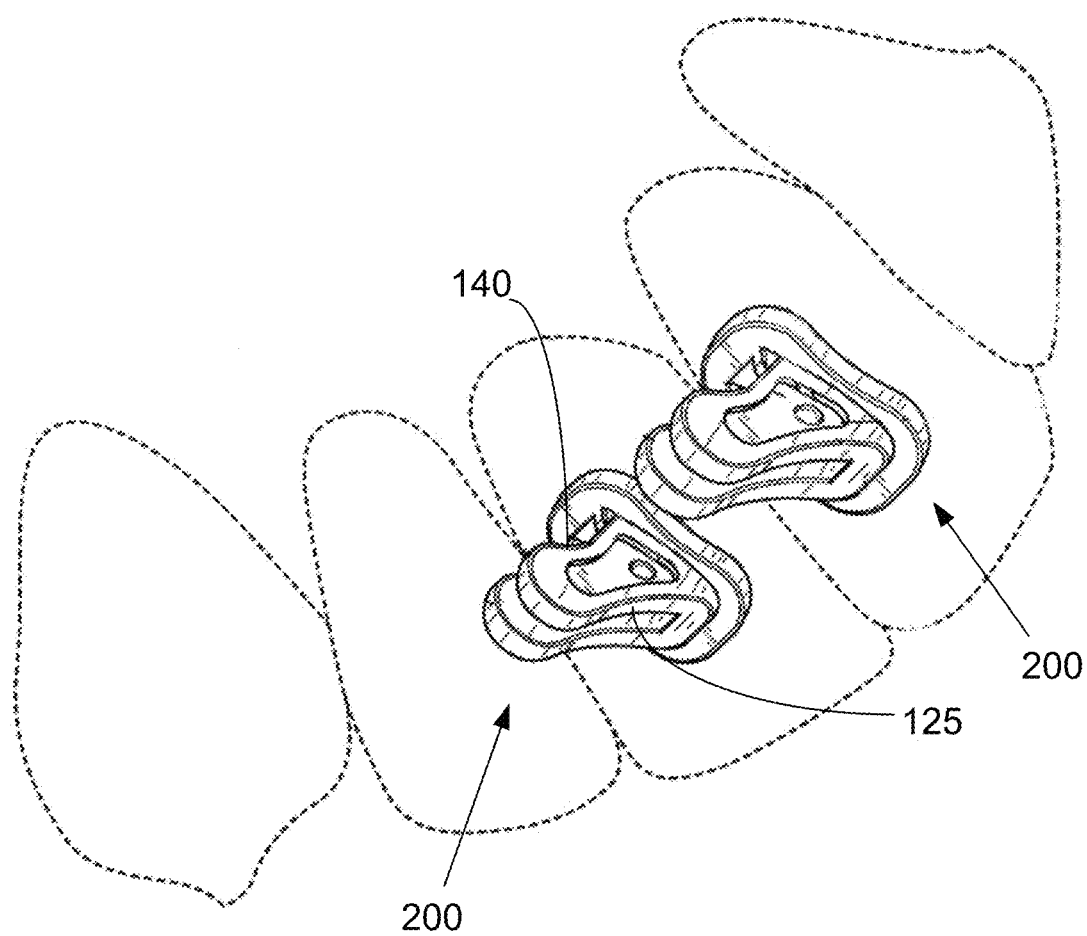
FIG. 11 is a top-side perspective view of the overbite correction device of FIG. 10 installed in a patient's maxillary (upper) arch.
Figure 12:
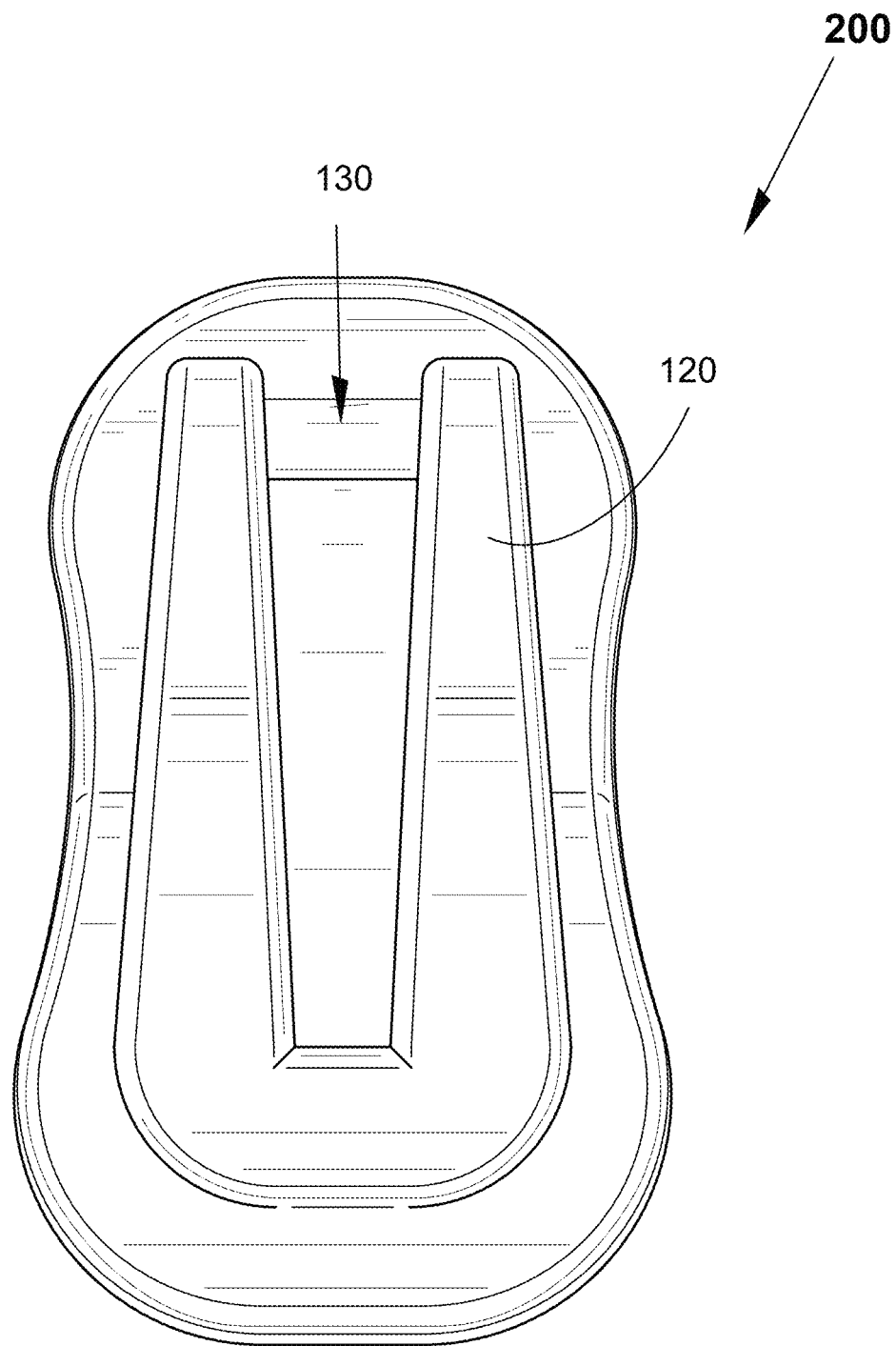
FIG. 12 is a front view of the overbite correction device of FIG. 10.
Figure 13:
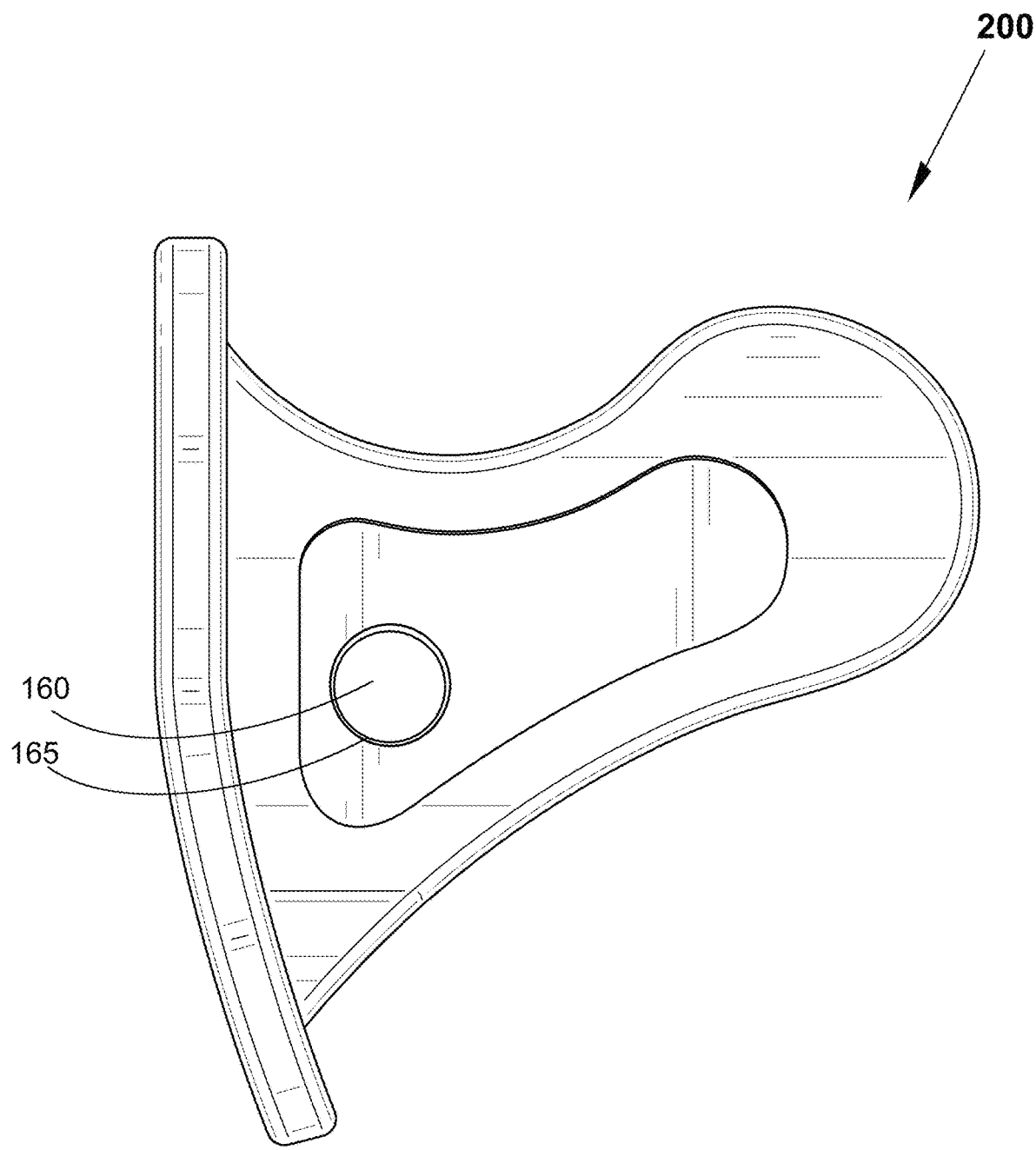
FIG. 13 is a left side view of the overbite correction device of FIG. 10.
Figure 14:
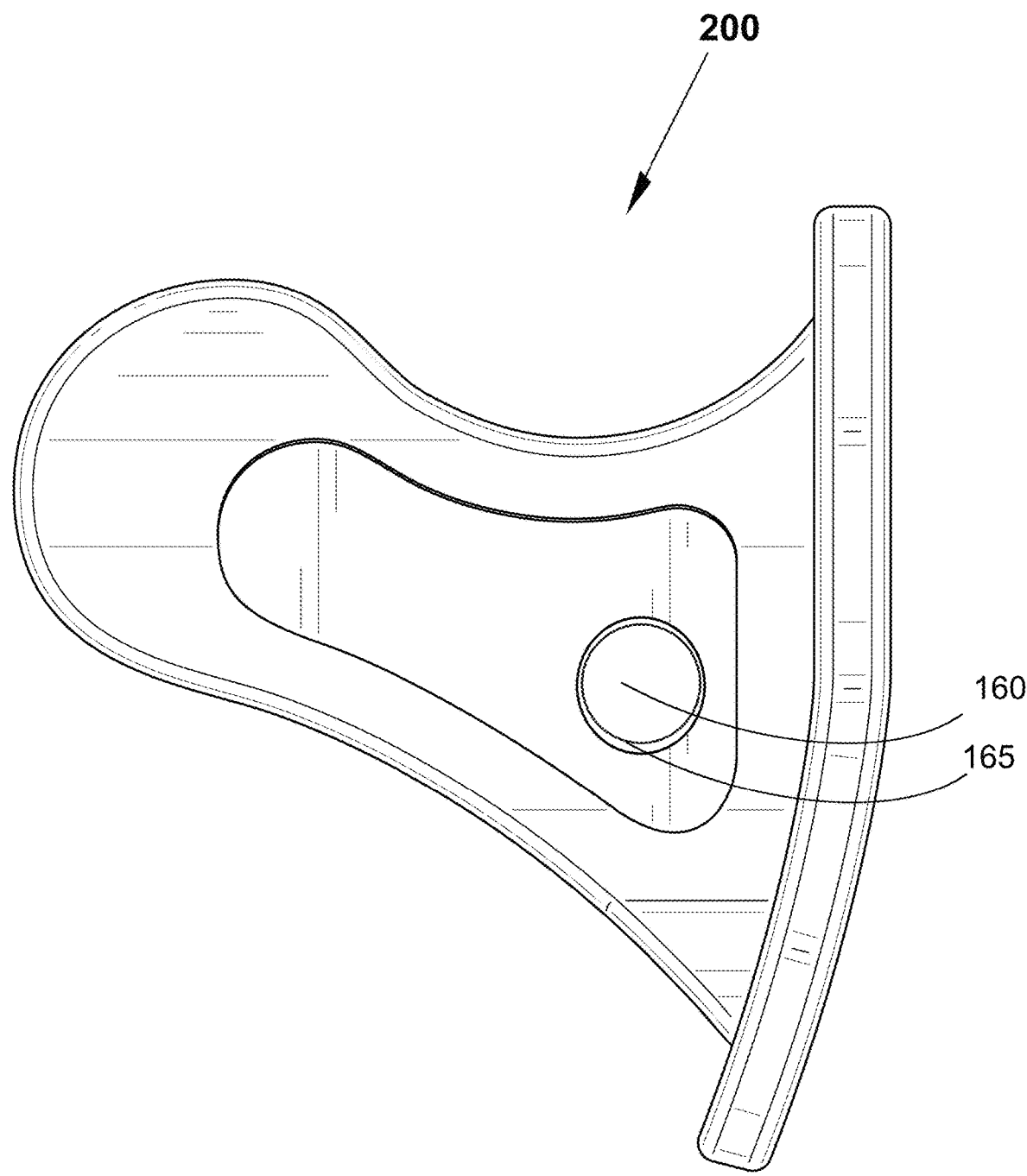
FIG. 14 is a right side view of the overbite correction device of FIG. 10.
Figure 15:
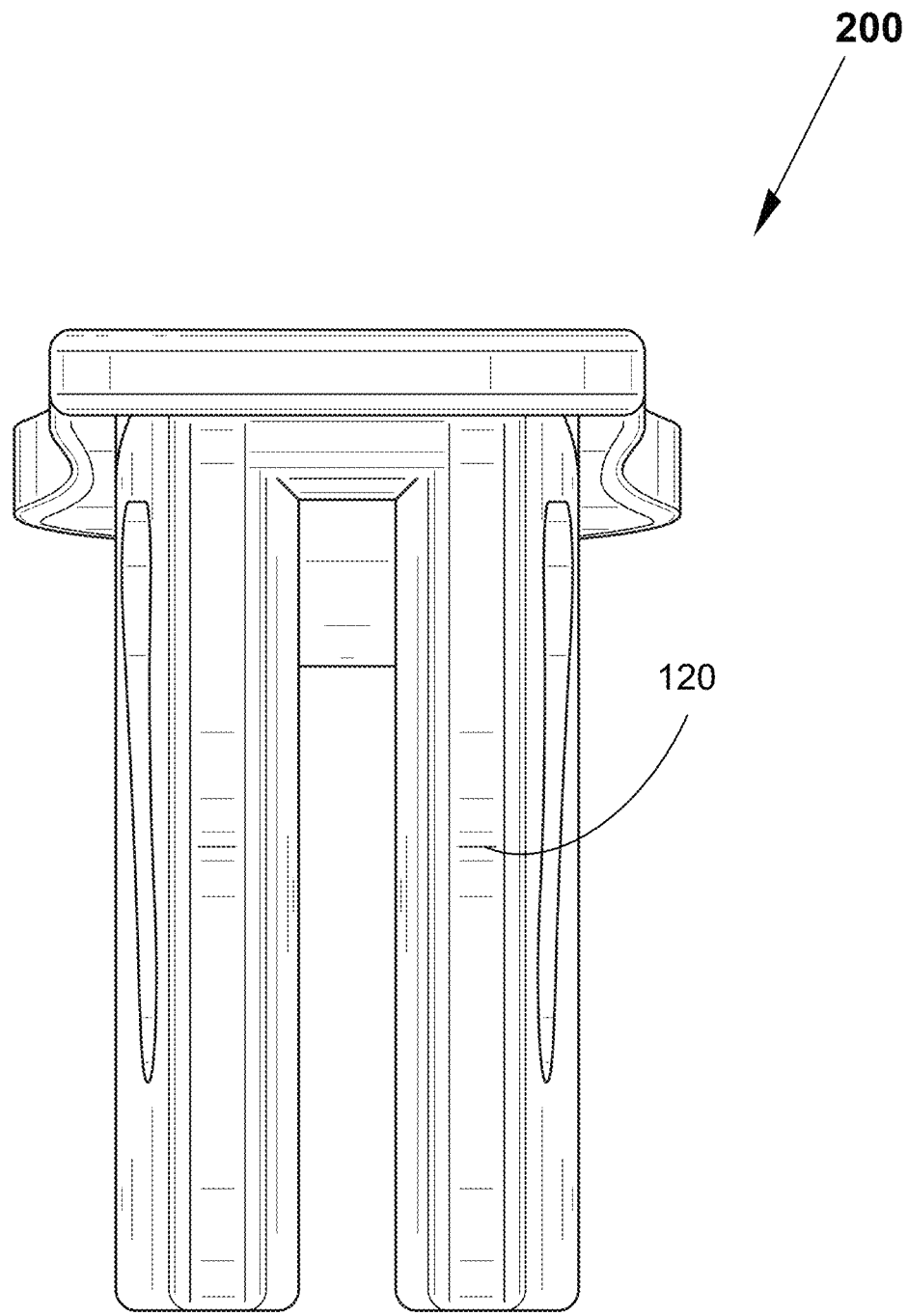
FIG. 15 is a top view of the overbite correction device of FIG. 10.
Figure 16:
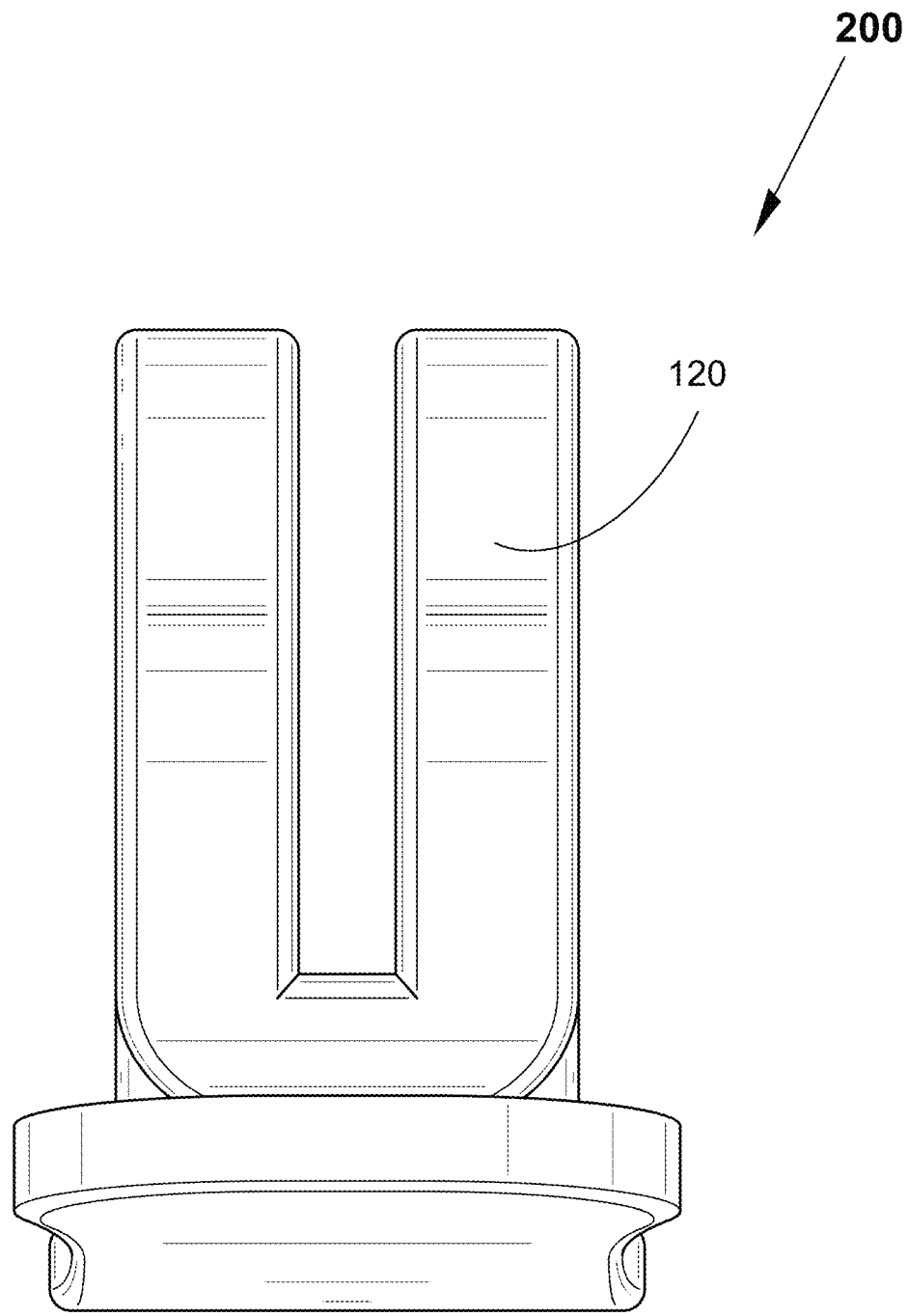
FIG. 16 is a bottom view of the overbite correction device of FIG. 10.
Figure 17:
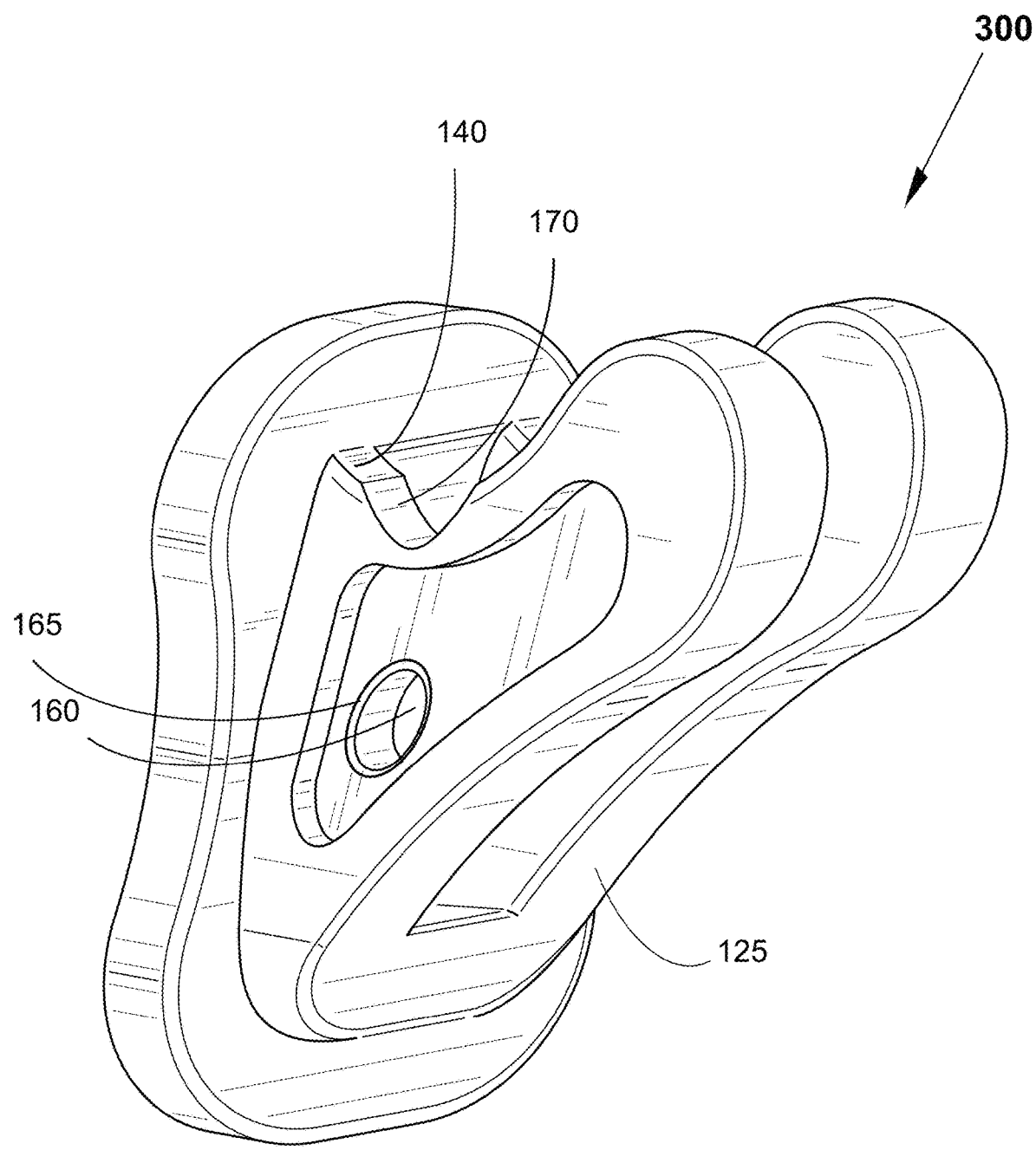
FIG. 17 is a side perspective view of an overbite correction device, having a round aperture therethrough, and a notch formed on a top surface thereof, in accordance with yet another embodiment of the present invention.

The BT2 mechanism of action is that it increases the vertical dimension and reduces the muscle hyperactivity related to CNS tension through the hypothalamus-adrenal pathway, as shown in FIG. 2. As the bite is opened with the application of BT2s, elastics in a rhomboid pattern (¼", 4.5 oz) are used posteriorly to erupt the buccal segments by lifting the curved archwires occlusally, and to intrude the incisors mildly with low resistance in the brackets. In Class II correction Differential Eruption is used by placing a full dimension upper arch wire 0.018"×0.025" stainless steel to act more as an anchorage unit and a lower dimension mandibular archwire in 0.016"×0.022" stainless steel. This permits the lower molars and premolars to be differentially erupted upward and forward to correct the Class II malocclusion, as shown in FIGS. 5*f*-5*h*. In addition, this also allows the BT2s to work effectively by simultaneously increasing the anterior vertical dimension to correct the Class II malocclusion in conjunction with the rhomboid elastics bilaterally for Rapid Bite Opening (RBO).

Special Procedures With BT2s and Over-Correction of Deep Overbites

In Class III malocclusions with lower incisor overclosure over the upper incisors anteriorly, BT2s are bonded to the lingual of the lower incisors to disarticulate the dentition and permit placement of the upper brackets. In Class III malocclusions the higher 0.018 X 0.025" stainless steel archwire is placed in the lower arch and the smaller dimension 0.016 X 0.022" stainless steel lower arch is placed in the upper arch for upper downward and forward differential eruption using Class III rhomboid pattern elastics from the lower canine hook to second premolar and upper canine hook to first upper first molar hook.

For Class II patients with severe overjet (in conjunction with deep overbite), bonding resin may be temporarily added to the BT2s and into the vertical groove to extend them horizontally. The BT2 is roughened with a high-speed diamond bur, etched, primed with metal primer, and bonded with bonding resin. The overall objective is to overcorrect the deep overbite to within a 20% overbite for long-term retention (it is equally important not to overly open the bite because the tongue may position anteriorly long-term). It is additionally recommended that upper and lower brackets from lateral-to-lateral be bonded 1 mm toward the incisal than the customary, average centre of the long-axis crown positions to facilitate rapid bite opening.

Advantages of BT2s Applications

A system was developed and tested for rapid bite correction. This included the use of new, bite towers lateral box elastics with active self-ligating brackets to provide freedom of movement of the system with recommended i-Arch wires for improved torquing moments. The BT2 system for rapid bite correction includes: 1. Two BT2s at the palatal of the upper central incisors bonded more incisally; 2. Active self-ligating appliance with NITI™ clips, bonded more incisally lateral-to-lateral incisor; 3. Reverse edgewise wires such as0.018". times. 0.014" archwires with compensating curve on the upper arch and reverse curve of Spee on the lower arch to further facilitate incisor intrusion; 4. Two elastics (¼", 4.5 oz) in rhomboid-shaped patterns at each of the buccal segments.

BT2s are ideally applied with a new super low profile, active self-ligating brackets, with NITI™ clips for light, continuous forces, completely coated for aesthetics, and with progressively lower forces from molars to incisors. This makes use of reduced resistance in vitro and active seating of archwires for tooth control including torque (future publication).

Further advantages of BT2 are as follows:
 1. Metal BT2s are highly effective chairside for rapid bite correction (RBC) for a minimum of 6 months.
 2. Efficiency chairside is gained by ready-made, bondable BT2s, that do not wear, and have bulbous rounded ends for tongue comfort in both children and adults.
 3. BT2s were easier to bond with a positioning instrument due to the new vertical groove (split) that made them also significantly easier to debond. The specialised curvature also developed early anterior guidance at a new vertical.
 4. BT2s are directly bonded to the palatal of the upper central incisors replacing prior plastic molds of bite ramps that required packed, light-cured resin that wears and is swallowed by patients throughout treatment.
 5. BT2s permit differential eruption of the molar teeth and are a significant improvement to bonded molar resin supports used for vertical correction in the past. The reason is prior molar resin supports are contraindicated since they have been shown to clinically intrude molars.

While most figures have shown the bite towers applied to the maxillary arch, the bite towers described may also be applied to the mandibular arch for treatment of an underbite, as shown in FIG. 29 for example.

While in most cases the bite towers (overbite correction devices) are applied to the lingual side of the incisors, in some cases they may also be applied to the lingual side of canines.

The above-described embodiments are intended to be examples of the present invention and alterations and modifications may be effected thereto, by those of skill in the art, without departing from the scope of the invention, which is defined solely by the claims appended hereto.

What is claimed is:

1. An overbite or underbite correction device for use on an upper incisor or canine tooth, the device comprising:
 a bracket body, for use with an upper incisor or canine tooth including two rounded lingual protrusions, and a vertical slot therebetween; and
 a base for bonding to the upper incisor or canine tooth at a lingual side thereof by means of a bonding pad;
 wherein the two rounded lingual protrusions each feature a curved lower-facing surface for receiving an incisor, to prevent incisor interference during grinding;
 wherein the lower-facing surface mimics a lingual anatomy of the upper incisor for improved anterior guidance during forward protrusion of the upper incisor during chewing or grinding and corresponding upper-facing surfaces;
 wherein tips of the two rounded lingual protrusions are rounded to provide tongue comfort; and
 wherein the vertical slot is dimensioned to accommodate an instrument therein to position and press-bond the correction device to an enamel.

2. The device of claim 1, further comprising dimples formed at mesial and distal surfaces of the two rounded lingual protrusions, said dimples for receiving a tweezer instrument used to install the device to, or remove the device from, the upper incisor or canine tooth.

3. The device of claim 1, further comprising an aperture formed mesiodistally in each of the two rounded lingual protrusions, the aperture being shaped and sized for receiving one of an elastic thread, metal ligature, or archwire therethrough.

4. The device of claim 3, wherein the aperture has a beveled edge for facilitating the entry of the elastic thread or metal ligature or archwire therethrough.

5. The device of claim 3, wherein the aperture is one of: elliptical, circular, rectangular, square, and triangular in shape.

6. The device of claim 3, further comprising a gingival recess for receiving and maintaining an additional elastic thread or metal ligature therein to prevent slipping of the additional elastic thread or the metal ligature during chewing.

7. A process of correcting underbites, comprising placing the device in claim 3 reversibly at a lower incisor or canine tooth by flipping said overbite correction device, for the treatment of underbites such that the bracket body is for use with the lower incisor or canine tooth.

* * * * *